(12) United States Patent
Andrejak et al.

(10) Patent No.: US 9,595,901 B2
(45) Date of Patent: Mar. 14, 2017

(54) METHOD FOR REGULATING A GENERATOR SET

(75) Inventors: Jean-Marie Andrejak, Saint Yrieix (FR); Samuel Moser, Gond-Pontouvre (FR); Patrice Betge, L'Isle d'Espangnac (FR)

(73) Assignee: MOTEURS LEROY-SOMER, Angouleme (FR)

( * ) Notice: Subject to any disclaimer, the term of this patent is extended or adjusted under 35 U.S.C. 154(b) by 22 days.

(21) Appl. No.: 14/342,418

(22) PCT Filed: Sep. 3, 2012

(86) PCT No.: PCT/IB2012/054533
§ 371 (c)(1),
(2), (4) Date: Mar. 13, 2014

(87) PCT Pub. No.: WO2013/030808
PCT Pub. Date: Mar. 7, 2013

(65) Prior Publication Data
US 2014/0203788 A1    Jul. 24, 2014

(30) Foreign Application Priority Data
Sep. 1, 2011   (FR) ...................................... 11 57720

(51) Int. Cl.
*H02P 9/10*    (2006.01)
*H02P 9/04*    (2006.01)
*H02P 9/30*    (2006.01)

(52) U.S. Cl.
CPC ................ *H02P 9/105* (2013.01); *H02P 9/04* (2013.01); *H02P 9/107* (2013.01); *H02P 9/302* (2013.01)

(58) Field of Classification Search
CPC .. H02P 9/04; H02P 9/105; H02P 9/302; H02P 9/107
(Continued)

(56) References Cited

U.S. PATENT DOCUMENTS 4,156,172 A    5/1979   Hucker et al.
5,703,410 A    12/1997  Maekawa
(Continued)

FOREIGN PATENT DOCUMENTS

DE    10 2004 017 087 A1    11/2005
FR    1 322 775             3/1963
(Continued)

OTHER PUBLICATIONS

International Search Report issued in International Application No. PCT/IB2012/054533 dated Nov. 20, 2013 (with translation).
(Continued)

*Primary Examiner* — Viet Nguyen
(74) *Attorney, Agent, or Firm* — Oliff PLC

(57) ABSTRACT

The invention relates to a method for regulating the output voltage of the alternator of a generator set, said generator set including a heat engine driving the alternator, the alternator including a rotor having a pole wheel. Said method includes the following step: detection of an increase in the power at the outlet of the alternator, and in the event of a detected increase, the value of the current in the polar wheel is modified in such a way as to temporarily bring the output voltage of the alternator to a value lower than the value before the detection of the increase in power, with the aim of decreasing the level of torque required from the heat engine.

14 Claims, 4 Drawing Sheets

Figure 1:
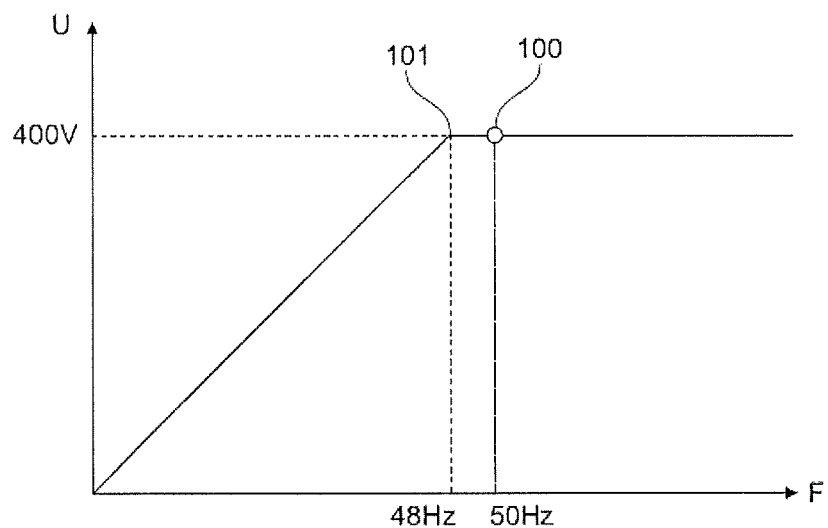

(58) Field of Classification Search
USPC .............................. 322/14, 28, 24, 20, 44, 22
See application file for complete search history.

(56) References Cited

U.S. PATENT DOCUMENTS

| | | | | |
|---|---|---|---|---|
| 6,359,421 | B1* | 3/2002 | Mueller | H02P 9/30 322/20 |
| 6,924,629 | B1* | 8/2005 | Mueller | H02J 7/245 322/28 |
| 2005/0104561 | A1* | 5/2005 | Kawabata | H02P 13/10 322/28 |
| 2005/0116474 | A1* | 6/2005 | Edelson | B60L 11/04 290/40 A |
| 2007/0120424 | A1* | 5/2007 | Lombardi | H02P 9/305 307/84 |
| 2007/0228735 | A1 | 10/2007 | Becker | |
| 2008/0157593 | A1* | 7/2008 | Bax | B60L 11/123 307/10.1 |
| 2009/0134845 | A1* | 5/2009 | Czajkowski | 322/28 |
| 2009/0153105 | A1* | 6/2009 | Czajkowski | 322/28 |
| 2010/0148518 | A1* | 6/2010 | Algrain | 290/1 R |
| 2010/0241283 | A1* | 9/2010 | Desai et al. | 700/295 |
| 2011/0175372 | A1* | 7/2011 | Eaton | H02P 9/04 290/40 B |
| 2011/0187199 | A1* | 8/2011 | Gietzold | H02P 9/02 307/75 |
| 2014/0176087 | A1* | 6/2014 | Mouni et al. | 322/59 |
| 2014/0225575 | A1* | 8/2014 | Andrejak et al. | 322/28 |
| 2015/0315989 | A1* | 11/2015 | Andrejak | H02P 9/04 123/350 |

FOREIGN PATENT DOCUMENTS

| | | |
|---|---|---|
| FR | 2 321 796 A1 | 3/1977 |
| WO | WO 2007/045801 A1 | 4/2007 |

OTHER PUBLICATIONS

Written Opinion of the International Searching Authority issued in International Application No. PCT/IB2012/054533 dated Nov. 20, 2013 (with translation).
Written Opinion issued in French Application No. 11 57720 dated Jun. 1, 2012 (with translation).

* cited by examiner

METHOD FOR REGULATING A GENERATOR SET

The present invention relates to the regulating of the alternators of generator sets.

A generator set consists of the assembly of an engine and an alternator. In order to provide a nominal voltage and frequency, both the engine and the alternator are equipped with regulation means. The engine is equipped with an electronic speed regulator, integrated into the fuel injection system of the engine. The regulation of the speed of the engine relies among other things on the measurement of the engine shaft rotation speed, for example by a sensor counting per time unit the number of teeth of a toothed ring gear passing in front of the sensor.

The speed regulator injection computer determines by virtue of the signal delivered by this sensor the fuel injection level so as to maintain the speed at a predefined value, but does not have direct knowledge of the load level which is applied to the engine, since no economic means exists for informing the computer of this load level.

Each variation in load applied to the engine, whether it be an increase or a decrease, results in a transient decrease or an increase in the engine revs that the speed regulator attempts to correct through an appropriate injection level.

In known generator sets, it is only by virtue of the knowledge of the speed and injection level that the regulator determines the load level which is applied to the engine.

The torque C demanded of the engine is directly proportional to the current I at the output of the alternator. Indeed, the power law P for the engine is:

$$P = C.w,$$

where w is the rotation speed of the engine.

The power law P for the alternator is:

$$P = U.I. \cos(\phi),$$

where U is the output voltage of the alternator and $\phi$ the phase shift between the current I and the voltage U.

The engine and the alternator being linked mechanically, it is possible to write, to within the efficiency of the coupling, that:

$$C.w = U.I. \cos(\phi).$$

During the application of a large active load, $\cos(\phi)$ becomes close to 1, and the voltage of the alternator drops. The alternator is equipped with a voltage regulator which rapidly corrects this voltage drop by increasing the current in the pole wheel.

The variation of the load also results in a drop in speed, since the torque C demanded of the engine increases. The engine being incapable of responding instantaneously to this request, its speed w drops, since a part of the torque C is drawn from the rotational kinetic energy reserve.

The way in which the engine picks up speed is essentially conditioned by how rapidly aid is applied to the engine by the voltage regulator.

Turbocharger engines are increasingly being used within generator sets. A drawback of this type of engine is the degradation of its performance if turbocharging cannot be initiated correctly.

Now, a heavy increase in the load is liable to slow the engine too much for correct operation of the latter. During idle operation, the air intake pressure is close to atmospheric pressure but as soon as the increase in the load is applied to the generator set, the speed of the engine drops to such a point that, despite the reaction of the speed regulator on the injection system, the exhaust gas stream is not sufficient to initiate the turbine or turbines of the turbochargers to their operating regime. They are then incapable of making the intake pressure increase, required in order for the engine to be capable of accelerating and of regaining its nominal speed. There therefore exists a point of no return that it is required to avoid reaching.

In a known manner, the engine aid is applied when the engine has already dropped in speed and its speed has dipped below a certain value.

The nominal operating point 100 of a generator set according to the prior art is represented on the curve of FIG. 1, corresponding for example as illustrated to a nominal voltage $U_n$, at the output of the alternator equal to 400 V and a nominal frequency $F_n$, equal to 50 Hz.

When an increase in the load takes place, the speed w of the engine drops, the frequency F reaching a threshold value of for example 48 Hz at a point 101, called the "elbow". In the known solution, the engine aid is then applied, making it possible, according to diverse procedures, to unload the engine so that it regains its setpoint speed as rapidly as possible.

Applying the engine aid only after the engine has already dropped in speed is penalizing since the engine will have more difficulties in, among other things, initiating its turbochargers, the exhaust gas stream being decreased, and in regaining an intake pressure suitable for picking up speed. Furthermore, between the nominal operating point 100 and the point 101, the torque demanded of the engine has increased, the voltage regulator having responded to the regulation law making it possible to keep the voltage U constant.

Figure 2:
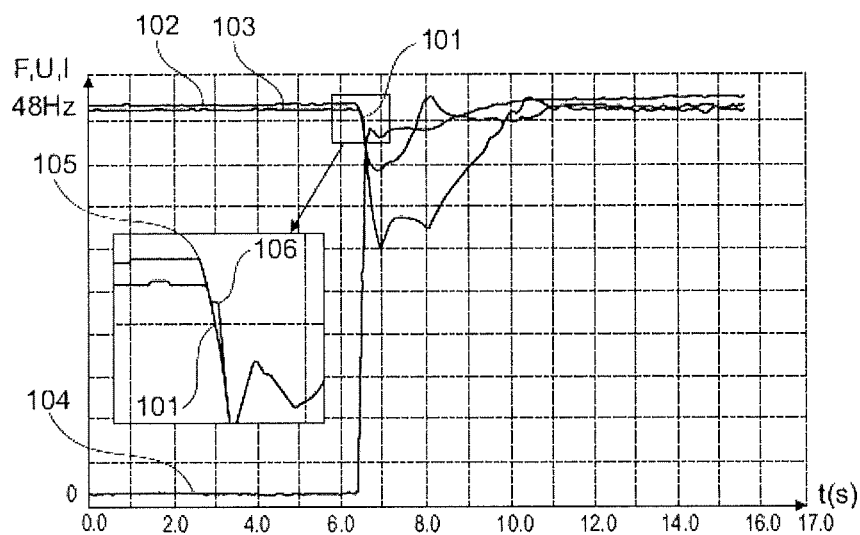

Three curves 102, 103 and 104 as a function of time t, expressed in seconds, are represented in FIG. 2, curve 102 representing the frequency F related to the speed w of the engine, curve 103 representing the output voltage U of the alternator and curve 104 representing the current I.

The voltage U, as illustrated in the magnified part of curves 102, 103 and 104, drops only after the frequency F has passed below the point 101. This delay in reaction is unfavourable to engine speed pick-up.

The criteria commonly demanded for generator sets are among others the criteria G2 of ISO standard 8528. These criteria define among other things the percentage of load to be applied to the generator set with respect to its nominal power so that it does not drop below 10% of its nominal speed and below 20% of its nominal voltage. For a given generator set, the higher the percentage of load to be applied, the better the set.

The reaction delay of the engine aid known, based on a speed measurement, does not render the system optimal and does not allow the generator set to contain its drop in speed, for large increases in the load, in the 10% permitted by the criteria hereinabove.

Patent application US 2007/0228735 discloses an energy production system in which a control device acts on a generator so as to change its output voltage in response to a variation in the rotation speed.

Patent application DE 10 2004 017 087 describes the regulation of the fuel injection in an engine at the level of the speed regulator, by detecting a modification of the load.

It is known from patent U.S. Pat. No. 5,703,410 to monitor the excitation current of an alternator and the injection of fuel on the basis of the knowledge of the rectified voltage at the output of the alternator.

It is also known from application EP 1 938 447 to control the fuel intake actuator of a generator set by virtue of a monitoring device delivering a control signal which is substituted for an output signal of the speed regulator when a load variation is detected.

Patent application US 2010/0241283 discloses a regulating procedure modifying the excitation current in the case of an increase in power. The speed regulator cooperates closely with the voltage regulator, thus entailing an integrated design of the voltage regulator or of the speed regulator.

There exists a requirement to further improve the performance of generator sets, especially during increases in the load, so as among other things to facilitate the use of turbocharger engines.

The invention is aimed at addressing this requirement at least in part and it achieves same, according to one of its aspects, by virtue of a method for regulating the output voltage of the alternator of a generator set, the latter comprising an engine driving the said alternator, the alternator comprising a rotor having a pole wheel, the method comprising the following step:

detect an increase in the power at the output of the alternator, and in the case that an increase is detected, modify the value of the current in the pole wheel, so as to temporarily bring the output voltage of the alternator to a value below that before detection of the increase in the power, with a view to decreasing the torque level demanded of the engine, preferably before the engine has dropped in speed.

By virtue of the invention, the current in the pole wheel is decreased appropriately even in the case of low applied load and the engine torque is reduced in an appropriate manner for the duration required for the increase in the power of the engine.

The voltage regulator of the alternator can at any moment observe the load level applied to the generator set and very rapidly compute the share of active power.

In the invention, regulation can thus be effected by knowing the power of the load applied to the generator set. Thus, a corrective action may be applied to the generator set as soon as the load increases. The performance of the generator set is increased without any other modification of its characteristics.

The power at the output of the alternator may be determined with the aid of a current sensor measuring the current passing through the main armature winding of the alternator and of a knowledge of the voltage at the output of the alternator. This information is transmitted to a computer of the voltage regulator of the alternator, which can compute the power and the variation in the power. The power may be computed with customarily known electrical quantities of a voltage regulator.

The detection of an increase in the load by virtue of the observation of electrical quantities allows anticipation of the drop in speed of the engine, and makes it possible to lower, consequent upon the drop in the output voltage of the alternator, the current at the output of the alternator, and thus the torque demanded of the engine. The drop in speed is limited in an effective manner.

The modification of the value of the current in the pole wheel, and consequently the resulting alternator voltage drop, may be dependent on the known power level when the increase in the load is detected. Knowing the load level of the generator set is useful, the state of the engine before the increase in the load influencing its behaviour, for example the intake pressure, during the increase in the load.

The modification of the current in the pole wheel or of the output voltage of the alternator may be dependent, in a linear or non-linear manner, on the derivative with respect to time of the power at the output of the alternator, this derivative possibly being computed continually, at regular intervals.

The evolution of the value of the current in the pole wheel or of the output voltage of the alternator as a function of the variation in the power at the output of the alternator can follow a predefined control law, for example prerecorded in a table, or computed as a function of at least one parameter, for example the power level.

The alternator output can supply a three-phase network, the nominal rotation speed of the engine being for example 1500 rpm and the nominal output voltage between phases of the alternator being for example 400V and 50 Hz.

To act on the current in the pole wheel, it is possible to act on the exciter excitation current when the alternator comprises an exciter having a coiled stator. The modification of the current in the pole wheel can be performed for example by decreasing the exciter excitation current.

In particular, in the case of an alternator comprising an exciter whose stator comprises permanent magnets, it is possible to act on the current in the pole wheel by arranging on the rotor a switching system making it possible to modulate the current in the pole wheel.

In such a variant, the alternator can comprise, at the rotor, a controller controlling the switching system. A transmission system, for example wireless, can communicate with the voltage regulator situated at the stator of the alternator.

The voltage regulator can control the switching system so as to regulate by pulse width modulation of the voltage across the terminals of the pole wheel. The regulator can vary the duty ratio of the pulse width modulation as a function of the value of the pole wheel current or of the output voltage sought. Such a variant makes it possible to improve the response time of the alternator when the load varies.

The regulating method according to the invention can be combined with other regulating measures aimed at improving the operation of the generator set, for example measures aimed at modifying the flowrate of fuel injected into the engine or the alternator voltage drop as a function of the variation in the rotation speed of the engine.

The subject of the invention is further, according to another of its aspects, a system for regulating the output voltage of the alternator of a generator set, the latter comprising an engine driving the said alternator, the alternator comprising a rotor having a pole wheel, the system being configured to detect an increase in the power at the output of the alternator and to modify the value of the current in the pole wheel, so as to bring the output voltage of the alternator to a value below that before detection of the increase.

The regulation system can comprise a computer which computes the derivative of the power with respect to time and when the latter is positive or greater than a certain threshold, instructs a decrease in the voltage at the output of the alternator so as to decrease the torque level demanded of the engine, preferably before the engine has slowed.

The decrease in the voltage which takes place can depend on the power level measured before the variation (starting state), the correction preferably being higher at low powers (engine idling) than at high powers (engine loaded).

The regulation system may be integrated into the voltage regulator of the alternator. The operation of the engine speed regulator can be totally autonomous from that of the regulation system. The regulation system can thus act independently of an exchange with the engine speed regulator. Stated otherwise, the engine speed regulator follows an inherent setpoint, which is neither modified nor imposed by the voltage regulator or by information transmitted by the latter to the speed regulator.

In the same manner, the voltage regulator does not receive, preferably, any information from the speed regulator.

All the characteristics of the invention which have been listed hereinabove in respect of the method hold also in respect of the regulation system.

Figure 3:
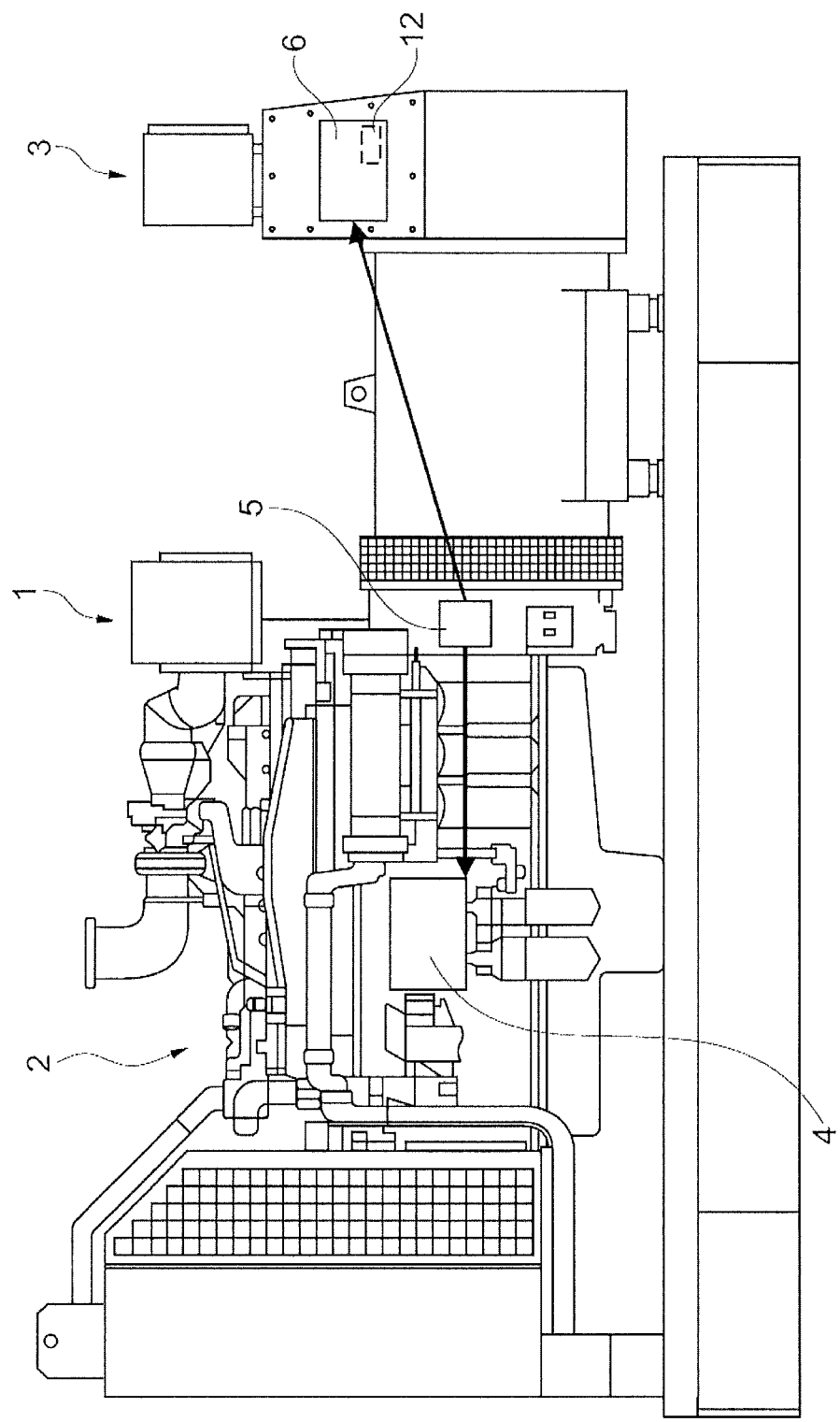
Figure 4:
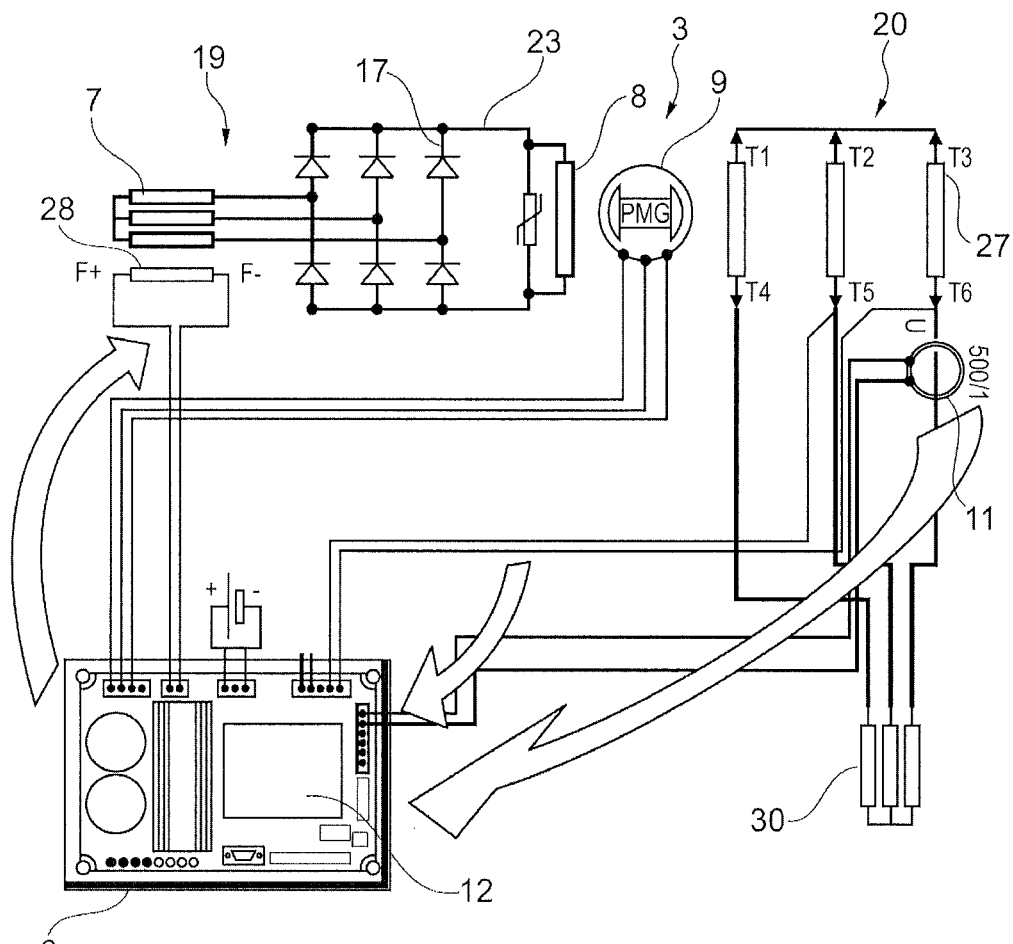
Figure 5:
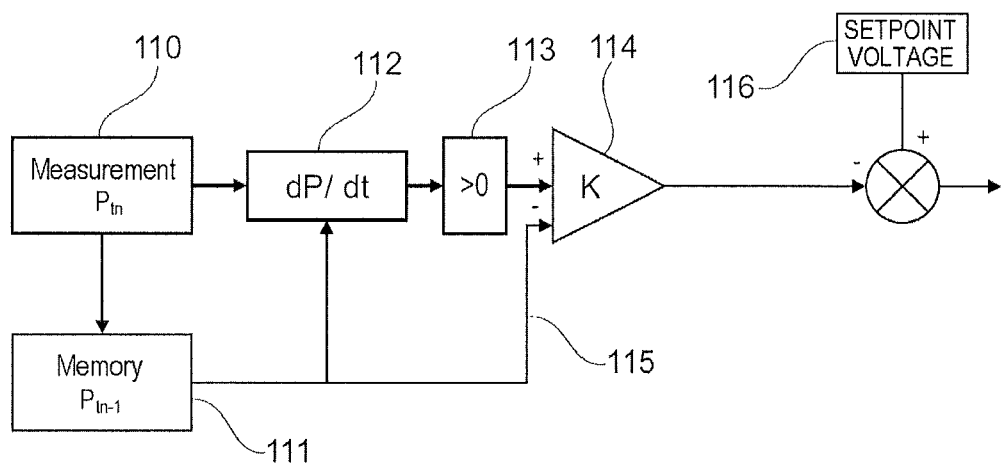
Figure 6:
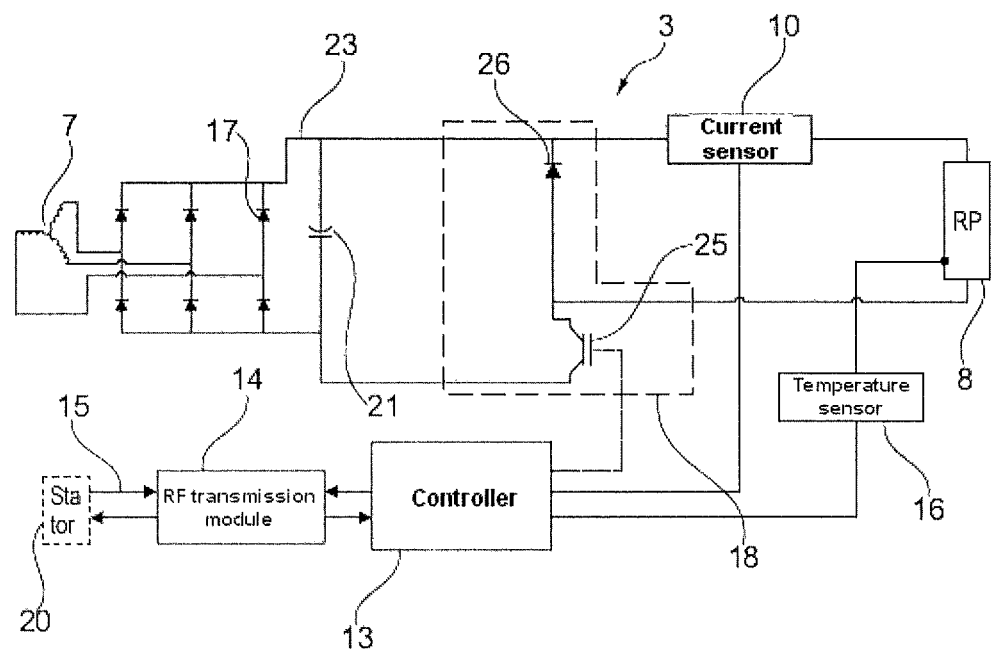
Figure 7:
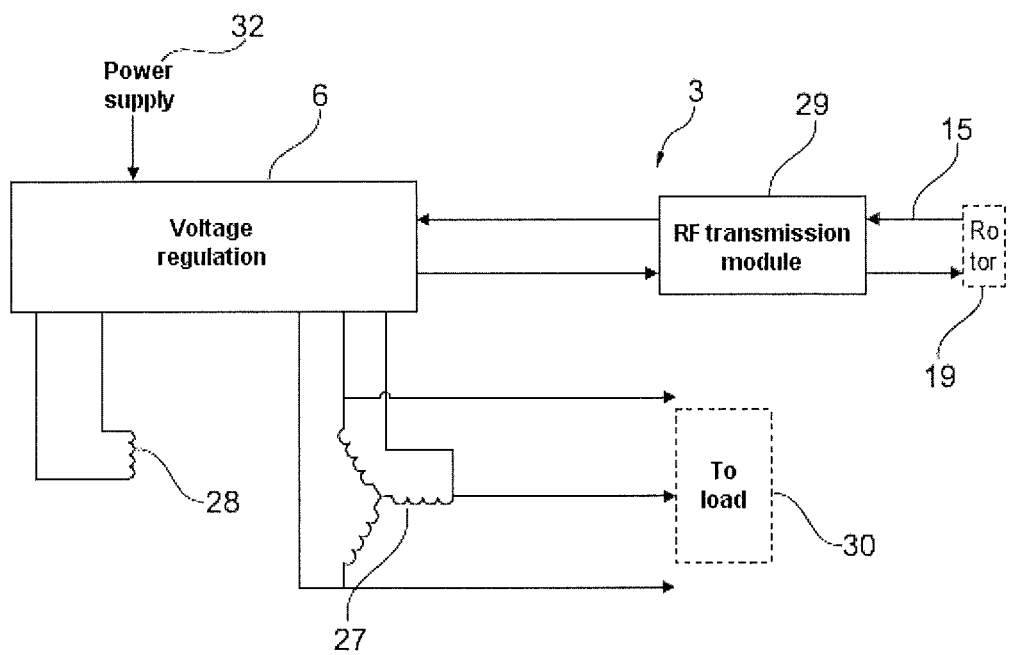

The invention may be better understood on reading the detailed description which follows of nonlimiting examples of the implementation thereof, and on examining the appended drawing in which:

FIGS. 1 and 2, already described, represent curves illustrating the regulation of a generator set according to the prior art, FIG. 3 represents a generator set according to the invention, FIG. 4 represents an alternator according to the invention, FIG. 5 represents in a schematic manner the regulation chain of a generator set according to the invention, and FIGS. 6 and 7 represent an alternator variant according to the invention.

The generator set 1 according to the invention, illustrated in FIG. 3, comprises an engine 2 and an alternator 3.

The engine 2 is advantageously a turbocharged engine, but the invention is not limited to a particular engine type.

The output of the alternator 3 supplies for example a three-phase network, the nominal speed $w_n$ of rotation of the engine 2 being for example 1500 rpm, the nominal frequency $F_n$ being equal for example to 50 Hz, and the nominal output voltage $U_n$ between phases of the alternator being for example 400V.

The rotor 19 of the alternator 3 comprises, in the example described, a rectifier 17 composed of a full-wave diode bridge, supplying a DC bus 23 on the basis of the exciter armature 7.

The alternator 3 comprises at the stator 20 an exciter inductor 28 and the main armature winding 27 is linked to a load 30, represented schematically.

The engine 2 comprises a speed regulator 4 comprising an injection computer which computes the fuel injection (or the control of the gases) of the engine so that the rotation speed w is kept constant as far as possible at a nominal value $w_n$.

The engine 2 comprises a speed sensor 5, that may be, for example, inductive, capacitive or optical. The sensor 5 is for example arranged in front of a toothed ring gear driven in rotation by the engine 2 and delivers to the injection computer pulses at a frequency proportional to the rotation speed w.

The alternator 3 comprises, as illustrated in FIG. 4, a voltage regulator 6 which comprises a system for regulating the output voltage of the alternator 3, designed to detect an increase in the load, on the basis of the knowledge of the power at the output of the alternator 3.

The regulation system computes the power P at the output of the alternator by virtue of information relating to the electrical quantities at the output of the alternator, for example the voltage U between phases at the output of the alternator and the current passing through the main armature winding 27 of the stator 20, this current being determined by virtue of a sensor 11. The voltage regulator 6 may be supplied by a generator having permanent magnets 9 or by any other means.

The voltage regulation system comprises a computer 12, for example microprocessor-based, which determines the current to be applied in the pole wheel 8 to keep the amplitude of the voltage at a setpoint value which by default is the nominal voltage $U_n$.

The regulation system is configured so as to modify, when an increase in the power is detected, the value of the current in the pole wheel 8, in such a way as to bring the output voltage U of the alternator 3 to a value below that before increase in the load.

As illustrated in FIG. 5, the active power $P_{tn}$ is measured at each instant $t_n$ in step 110, the value $P^{tn-1}$ measured at the instant $t_{n-1}$ being recorded during a step 111. The derivative dP/dt is computed in step 112.

Under nominal operation, in the absence of any correction to be applied, that is to say if dP/dt is zero or less than a predefined threshold, the regulation chain keeps the voltage of the alternator at the setpoint value 116 which is the nominal voltage.

If the derivative of the active power dP/dt is positive, a correction K to be applied to the setpoint voltage is determined in step 114, with a view to decreasing the voltage at the output of the alternator and temporarily reducing the torque demanded of the engine, so as to allow it to accelerate more easily. To reduce the output voltage, the regulator acts on the current in the pole wheel.

The value of the current in the pole wheel is thus modified as a function of the derivative of the active power dP/dt. The evolution of the current in the pole wheel or of the output voltage as a function of the derivative of the active power dP/dt follows a predefined control law, which may be tabulated or computed at each instant. The control law depends on the engines and on their performance.

The modification of the value of the current in the pole wheel 8 and of the output voltage of the alternator depends on the variation in the active power at the output of the alternator 3, and preferably also the active power level. Thus, the correction K may be modulated as a function of the level 115 of active power at the instant $t_{n-1}$.

Thus, the higher the power, the smaller the correction can be since the engine already has an operating regime which allows it to withstand the load variations better.

Once the power of the engine has increased and the rotation speed w increases, the value of the current in the pole wheel can again be modified, so as to bring the value of the output voltage U back to that before increase in the load, to the nominal operating point 100.

The voltage regulator 6 can act in a conventional manner on the excitation current at the stator 20 so as to modify the current in the pole wheel and thus vary the voltage U.

In the variant represented in FIGS. 6 and 7, the rotor 19 comprises a built-in communication system, and the DC bus 23 is linked to a switching system 18. A filtering capacitor 21 may be envisaged. Other setups with thyristor-based or triac-based switching systems may be envisaged.

The switching system 18 may be composed as illustrated of a free wheel diode 26 and of a switchable electronic component 25, for example an IGBT transistor.

A controller 13 controls the switching system 18 so as to regulate by pulse width modulation the voltage in the pole wheel 8. The duty ratio fi of the pulse width modulation is dependent among other things on the output voltage of the main machine, so as to keep as far as possible the voltage delivered by the alternator 3 at the desired value.

In the example illustrated, the rotor 19 comprises a current sensor 10 for measuring the current in the pole wheel 8. The value thus measured of the current is transmitted to the controller 13.

The voltage regulator 6 at the stator 20 is powered by a power supply 32, and the exciter inductor 28 is coiled, in the example described. An HF wireless communication system is arranged between the controller 13 of the rotor 19 and the voltage regulator 6 of the stator 20 of the alternator 3. The wireless communication system is composed of a transmission module 14 arranged at the rotor 19, of a transmission module 29 arranged at the stator 20, and of wireless transmission pathways 15 linking the said modules.

The value of the current in the pole wheel 8, measured by the current sensor 10 of the rotor 19, is transmitted to the voltage regulator 6 of the stator 20 by the wireless communication system 14, 15, 29.

The invention is not limited to the examples which have just been described. For example, the exciter is of the permanent magnets type, in a variant of FIG. 7, not illustrated.

The expression "comprising a" should be understood as being synonymous with "comprising at least one", unless specified otherwise.

The invention claimed is:

1. A method for regulating an output voltage of an alternator of a generator set, the generator set including an engine driving the alternator, the engine including a speed regulator, and the alternator including a rotor having a pole wheel and a regulation system, the method comprising:
    detecting, using the regulation system, an increase in power at an output of the alternator due to an increase in load; and
    modifying, using the regulation system, a value of current in the pole wheel when the increase in the power at the output of the alternator is detected, so as to temporarily lower the output voltage of the alternator to a value before the increase in load in order to decrease a torque level demanded of the engine before the engine has dropped in speed, the modifying of the value of the current in the pole wheel being dependent on a derivative of the power at the output of the alternator with respect to time, wherein
    an operation of the speed regulator is autonomous from that of the regulation system.

2. The method according to claim 1, wherein the power at the output of the alternator is determined using:
    a current sensor measuring current passing through a main armature winding of the alternator, and
    the output voltage of the alternator.

3. The method according to claim 1, the engine being a turbocharged engine.

4. The method according to claim 1, the modification of the current in the pole wheel is performed by decreasing an exciter excitation current.

5. The method according to claim 1, the modification of the current in the pole wheel is performed by a pulse width modulation of voltage across terminals of the pole wheel.

6. The method according to claim 1, the modification of the output voltage of the alternator being dependent on a power level of the alternator.

7. The system according to claim 1, wherein the modifying of the value of the current in the pole wheel depends on the derivative of the power at the output of the alternator with respect to time in a linear manner.

8. The system according to claim 1, wherein the modifying of the value of the current in the pole wheel depends on the derivative of the power at the output of the alternator with respect to time in a non-linear manner.

9. A system comprising:
    a generator set including:
        an alternator including a rotor having a pole wheel; and
        an engine driving the alternator, the engine including a speed regulator; and
    a regulation system configured to detect an increase in power at an output of the alternator due to an increase in load and to modify a value of current in the pole wheel when the increase in the power at the output of the alternator is detected, so as to lower the output voltage of the alternator to a value before the increase in load, before the engine has dropped in speed, the modification of the value of the current in the pole wheel being dependent on a derivative of the power at the output of the alternator with respect to time, wherein
    an operation of the speed regulator being totally autonomous from that of the regulation system.

10. The system according to claim 9, wherein the regulation system includes a computer which computes the derivative, and when the derivative is positive or greater than a certain threshold, instructs a decrease in the voltage at the output of the alternator so as to decrease a torque level demanded of the engine.

11. The system according to claim 9, wherein the decrease in the voltage depends on a power level of the alternator.

12. The system according to claim 9, wherein the regulation system includes a controller rotating with the rotor and configured to control the current in the pole wheel by a pulse width modulation of voltage across terminals of the pole wheel.

13. The system according to claim 9, wherein the modification of the value of the current in the pole wheel is dependent on the derivative of the power at the output of the alternator with respect to time in a linear manner.

14. The system according to claim 9, wherein the modification of the value of the current in the pole wheel is dependent on the derivative of the power at the output of the alternator with respect to time in a non-linear manner.

* * * * *